United States Patent [19]

McHaney

[11] Patent Number: 5,807,976
[45] Date of Patent: Sep. 15, 1998

[54] METHOD FOR PRODUCT RECOVERY OF POLYOLEFINS

[76] Inventor: Stephen McHaney, 6305 Bainbridge Dr., Odessa, Tex. 79762

[21] Appl. No.: 598,820

[22] Filed: Feb. 9, 1996

Related U.S. Application Data

[63] Continuation of Ser. No. 357,159, Dec. 15, 1994, which is a continuation of Ser. No. 102,289, Aug. 5, 1993, abandoned.

[51] Int. Cl.⁶ ........................................................ C08F 6/28
[52] U.S. Cl. ......................... 528/481; 528/500; 528/501; 528/502 C
[58] Field of Search ...................................... 528/481, 500, 528/501, 502 C

[56] References Cited

U.S. PATENT DOCUMENTS

| | | | |
|---|---|---|---|
| 3,219,622 | 11/1965 | Luciani et al. | 260/45.95 |
| 3,690,180 | 9/1972 | Van Der Veer | 73/432 R |
| 3,773,743 | 11/1973 | Ainsworth, Jr. et al. | 260/94.9 |
| 4,094,942 | 6/1978 | Nakai et al. | 528/500 |
| 4,098,990 | 7/1978 | Lutze et al. | 528/499 |
| 4,099,335 | 7/1978 | Jezl et al. | 34/9 |
| 4,137,387 | 1/1979 | Miserlis et al. | 528/499 |
| 4,340,701 | 7/1982 | Willmore et al. | 528/503 |
| 4,504,615 | 3/1985 | Mills | 526/352 |
| 4,701,489 | 10/1987 | Hughes et al. | 524/350 |
| 4,958,006 | 9/1990 | Bernier et al. | 528/501 |
| 5,206,292 | 4/1993 | Hwo et al. | 528/499 |

FOREIGN PATENT DOCUMENTS

| | | |
|---|---|---|
| A-0123882 | 10/1984 | European Pat. Off. . |
| A-0348907 | 1/1990 | European Pat. Off. . |
| A-2387753 | 11/1978 | France . |

OTHER PUBLICATIONS

"Heat–Transfer Equipment" and Liquid Solid Systems, *Perry's Chemical Engineers' Handbook*, pp. 11–48 and 19–16, Sixth Edition, 1984.

*Primary Examiner*—Thomas R. Weber
*Attorney, Agent, or Firm*—Pennie & Edmonds LLP

[57] ABSTRACT

A method for product recovery method of polyolefins, particularly high-molecular-weight amorphous poly alpha-olefins, wherein the use of water during the method is significantly decreased and wherein the intermediate stage of storing and drying the chunk form of the polyolefin is eliminated. Polyolefins produced in a reactor are heated in a kneader to remove any unreacted monomer(s). The polyolefin material in a liquid form is then transferred directly to an extruder to further remove any unreacted monomer(s) and catalyst(s). Finally, the polyolefin material is pelletized using a pelletizer.

18 Claims, 2 Drawing Sheets

METHOD FOR PRODUCT RECOVERY OF POLYOLEFINS

This is a continuation of application Ser. No. 08/357,159, filed Dec. 15, 1994, now pending which is a continuation of 08/102,289 filed Aug. 5, 1993, now abandoned.

TECHNICAL FIELD

The present invention relates to methods for product recovery of polyolefins, and more specifically to a method of product recovery for high-molecular-weight amorphous poly alpha-olefins.

BACKGROUND OF THE INVENTION

High-molecular-weight amorphous poly alpha-olefins such as amorphous propylene homo- and co-polymers, are important for their use in diverse products. The broad utility of these materials is due in large part to the unique combination of chemical and physical properties such as chemical inertness, softness, flexibility, etc., exhibited by these materials.

Conventionally, amorphous polyolefins are formed in a reactor and mixed with water to deactivate catalysts and remove any monomer(s). Removing the catalysts and any monomer(s) renders wet, granular chunks of the product. For the material to be shaped into various products, the chunks must be dried and then extruded or otherwise shaped.

Extrusion of the material typically involves feeding the dried chunks from a hopper to the feed section of a screw-type extruder. The polyolefin material is moved through the extruder by screw flights where it is heated and mechanically worked before it is pelletized or otherwise shaped under high pressure. Alternatively, such materials are also shaped by other high temperature methods such as injection molding, roll milling and compression molding. Both lower- and higher-molecular-weight amorphous poly alpha-olefins are typically processed as outlined above.

However, existing methods of product recovery require the introduction of water to carry the material through the several stages of recovery. The extensive use of water by these methods requires that additional storage tanks, delivery and removal lines and other miscellaneous equipment be used to introduce, maintain, remove and recycle the necessary volume of water. Additionally, existing methods store the material in a chunk form prior to extrusion into useable products, thus requiring additional storage tanks and associated maintenance equipment for this intermediate stage of processing.

Thus a need has arisen for a product recovery method for polyolefins, particularly high-molecular-weight amorphous poly alpha-olefins, wherein the use of water during the product recovery is significantly decreased and wherein the intermediate stage of storing and drying the chunk form of the polyolefin is eliminated.

SUMMARY OF THE INVENTION

The present invention overcomes the foregoing and other problems associated with the prior art by providing a product recovery method for polyolefins, particularly high-molecular-weight amorphous poly alpha-olefins, wherein the use of water during the method is significantly decreased, reducing the need for additional equipment such as storage tanks, lines and valves, and wherein the method operates such that intermediate storage of the material is eliminated, thus preventing the need for additional storage tanks and associated maintenance equipment.

According to the present method of product recovery for polyolefins, the monomer(s) for the polyolefin are fed into a reactor. The reactor is cooled to maintain the appropriate temperature necessary for the production of the desired polyolefin. Depending upon the polyolefin desired, appropriate catalysts are added to the reactor.

As the polyolefin material is produced, it is transferred from the reactor to a kneader. This transfer is accomplished by a number of methods, but is preferably accomplished via a blipper valve. Inside the kneader, the polyolefin material is heated to drive off any unreacted monomer(s) remaining in the polyolefin material. Sigma blades are used to mechanically work the product material to facilitate this removal process.

The polyolefin material is then transferred via the screw flights of the kneader to an extruder for further processing. This step of the method, the direct transfer of the polyolefin material in a liquid form, provides a distinct advantage over prior methods of storing the polyolefin in wet chunk form and drying the chunks at a later date for extrusion.

In the extruder, the polyolefin material is mixed with small amounts of water to deactivate any remaining catalyst (s) in the material and antioxidants. Heating the material further drives off any unreacted monomer(s), antioxidant solvents and excess steam added during this stage.

Finally, the polyolefin material is transferred to a pelletizer where it is pelletized for storage and/or use.

High-molecular-weight amorphous poly alpha-olefins exhibit increased tackiness and viscosity when compared with lower-molecular-weight poly alpha-olefins. Product recovery of these higher-molecular-weight poly alpha-olefins has proven especially successful utilizing the present method of recovery.

The present method minimizes the use of water to carry the product through the several stages of recovery processing, thereby minimizing the need for storage tanks, delivery and removal lines, valves and other equipment used to introduce, maintain, remove and recycle the water. Additionally, the present method allows for continuous processing of the polyolefin material in a substantially liquid or molten state. This avoids the intermediate step associated with existing methods of product recovery wherein the material is stored as wet chunks and dried at a later stage for further processing. The elimination of this step also precludes the need for additional equipment required for the storage, maintenance and drying of the product material prior to further processing.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
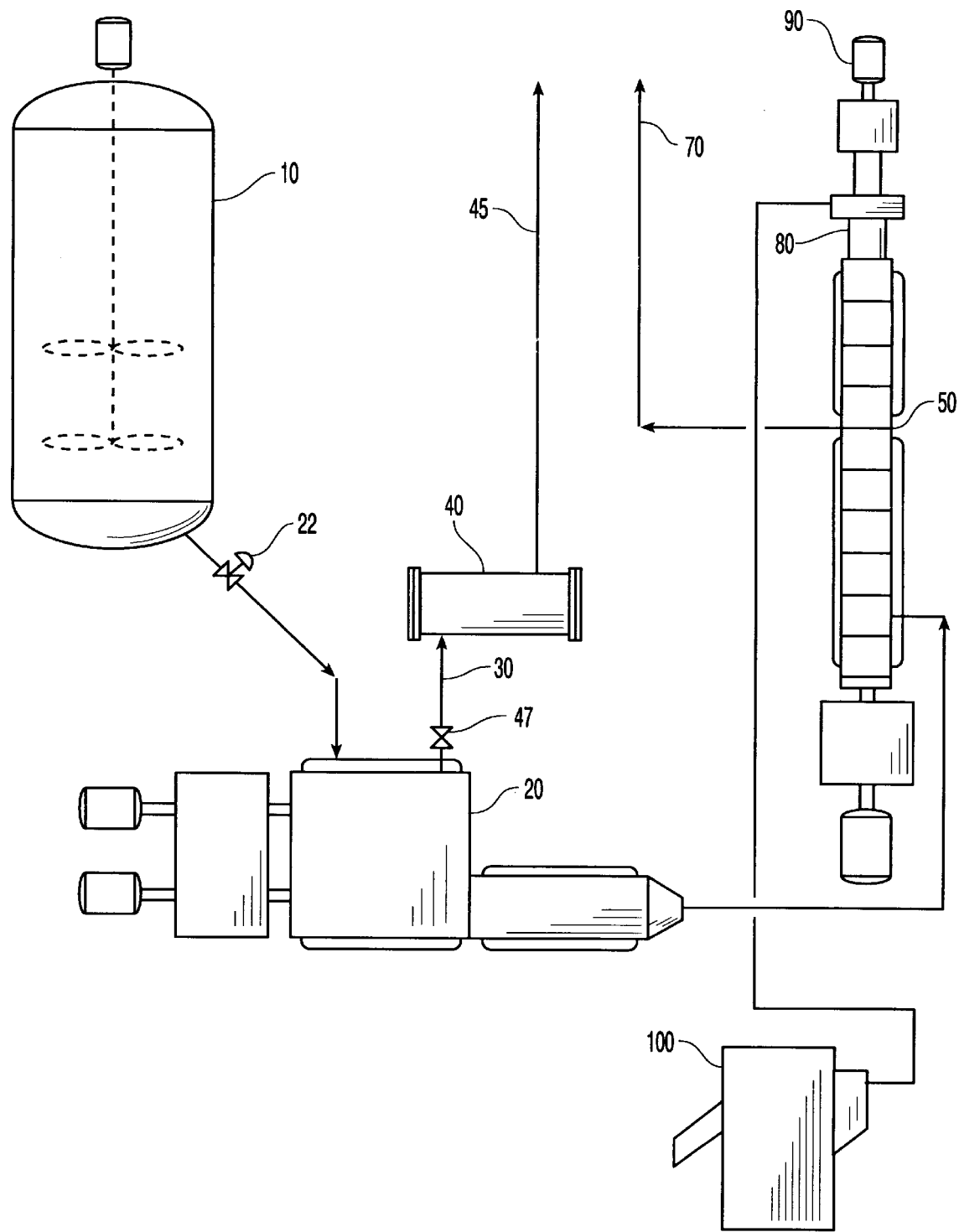
FIG. 1 illustrates the apparatus associated with the product recovery method of the present invention.

Referring now to FIG. 1, there is shown the apparatus associated with the product recovery method of the present invention.

The monomer(s) comprising the polyolefin to be produced are continuously fed into a reactor 10. The monomer (s) utilized will naturally depend upon the polyolefin to be produced. The reactor is cooled and pressurized to maintain the desired temperature and pressure for the reaction to occur. The resulting polymer is continuously transferred to a kneader 20 via a blipper valve 22. The use of a blipper valve 22 allows for convenient control of the rate at which the product material is released from the reactor 10 to the kneader 20.

In the kneader 20, the product material is heated to a temperature of from about 250°–500° Fahrenheit, depending upon the polyolefin to be produced. This increase in temperature drives off unreacted elements contained within the product material, such as unreacted propylene, ethylene, hydrogen and other monomers.

A pair of sigma blades (not shown) within the kneader 20 mechanically works the product material to facilitate the removal of unreacted monomers and other volatiles from the product material. The gases produced by this process are vented through a vent line 30 from the kneader 20 to a knockout pot 40. From the knockout pot 40, the vented gases are purified and returned to the polyolefin plant for reuse via return line 45. To prevent carryover of the polyolefin material into the vent line 30, a vent valve 47 closes during each blip of material from the reactor 10 to the kneader 20. With the vent valve 47 closed, the high gas velocity within the relatively small volume kneader does not drive the polyolefin material into the vent line 30. The vent valve 47 is operated by a microprocessor-based timer (not shown) which controls and coordinates both the blipper valve 22 and the vent valve 47.

Product material is delivered from the sigma blades to a variable speed screw (not shown). The screw fights transfer the product material from the kneader 20 to an extruder 50. The speed of the screw is adjusted so as to maintain a constant inventory of product material in the kneader 20. The barrel of the screw is heated to maintain the product material at a temperature substantially consistent with the temperature in the kneader 20.

In the extruder 50, the product material is mixed with steam to deactivate the catalysts and with additives to achieve the desired polyolefin material. The steam is added, via a metered water pump (not shown) to deactivate the catalyst(s) added to the reactor 10 to facilitate formation of the polyolefin. Importantly, this is the only place that water is used in the product recovery method of the present invention.

Additional heating facilitates the removal of any excess water and further removes any remaining unreacted monomers or other volatiles from the product material. Gases produced within the extruder 50 are vented via an extruder vent line 70 from the extruder 50.

From the extruder 50, the product material is transferred to a pelletizer 80. The pelletizer 80 includes a die plate and a set of rotating blades (not shown) driven by a variable speed motor 90. Heat is provided to the die plate to maintain the product material at an extrusion temperature. As the product material emerges from the die holes, it is cut into pellets sized according to the speed of the rotating blades and is cooled by circulating water. The product material rapidly solidifies upon contact with the water.

The pellets are carried by flowing water to a dryer 100, where the pellets are recovered from the water and dried with air. The pellets are then packaged and stored for later use.

Figure 2:
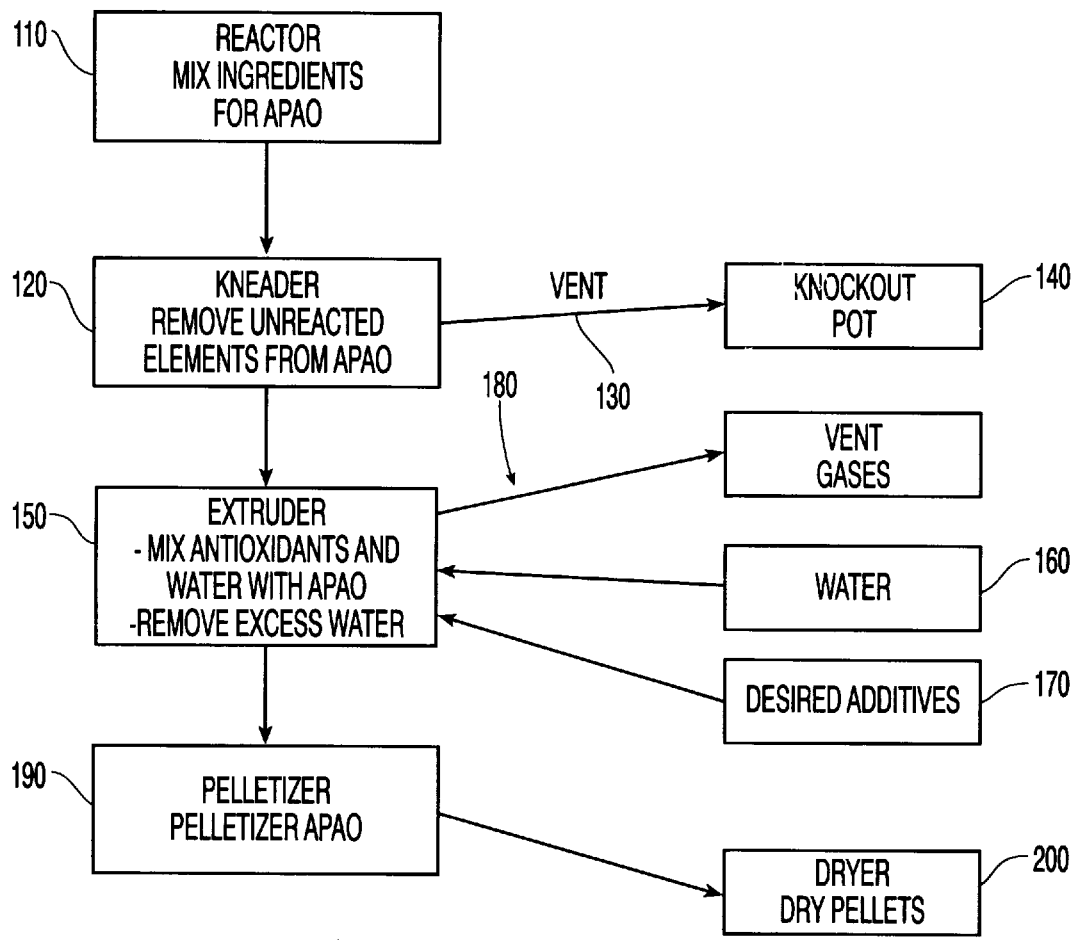
FIG. 2 is a flow diagram illustrating the steps associated with the product recovery method of the present invention.

FIG. 2 is a flow diagram illustrating the steps associated with the product recovery method of the present invention. The monomer(s) necessary to produce the desired polyolefin are continuously fed into a reactor during step 110. The reactor is cooled to facilitate the production of the polyolefin material. Polyolefin material is then transferred to a kneader where unreacted monomer(s) and volatile(s) are removed 120. The monomer(s) and volatile(s) are driven off by heating the polyolefin material in the kneader. Mechanical working of the polyolefin material by a pair of sigma blades in this step enhances the removal of unreacted elements. Gases produced during this step of the process are vented through a knockout pot and are purified for reuse 130 and 140.

In step 150, the polyolefin material is transferred to an extruder where water and desired additives such as antioxidants are mixed with the polyolefin material 160 and 170. The addition of water deactivates the catalysts in the polyolefin material. Gases produced during this step of the product recovery method are also vented 180.

Next, the polyolefin material is transferred from the extruder to a pelletizer. In the pelletizer, the polyolefin material is cut via rotating blades into pellets and is cooled by circulating water 190. The pellets are transferred by the flowing water to a dryer. The pellets are removed from the water and dried with air prior to being packaged or used 200.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention.

I claim:

1. A method for the recovery of a high-molecular-weight amorphous polyolefin comprising:

reacting monomer(s) in a reaction zone to form a high-molecular-weight amorphous polyolefin;

continuously transferring blips of material containing the polyolefin along with residual catalyst and unreacted monomer(s) as a mixture from the reaction zone to a recovery zone;

venting unreacted monomer(s) from the recovery zone;

controlling the transfer of the material blips into the recovery zone without introducing water and while substantially avoiding carryover of the polyolefin back to the reaction zone during the venting step;

heating the mixture of said material blips in the recovery zone to a temperature of at least about 250° F. while kneading the mixture for a time sufficient to remove unreacted monomer(s) from the polyolefin and to facilitate transfer of recovered polyolefin from the recovery zone to an extrusion zone; and controlling the material blip transfer, heating, and kneading steps to maintain a substantially constant inventory of the polyolefin in the recovery zone.

2. The method of claim 1, which further comprises recycling the vented unreacted monomer(s) back to the reaction zone.

3. The method of claim 1, which further comprises deactivating residual catalyst contained in the polyolefin in the extrusion zone.

4. The method of claim 3, which further comprises:

deactivating the catalyst by mixing the polyolefin with steam in the extrusion zone; and removing steam and additional unreacted monomer(s) from the polyolefin in extrusion zone by venting.

5. The method of claim 1, wherein the kneading step comprises mechanically working the polyolefin in the recovery zone by passing the polyolefin through rotating sigma blades to facilitate the removal of unreacted monomer(s).

6. The method of claim 4, which further comprises controlling the temperature of the polyolefin in the extrusion zone to be substantially the same as the temperature of the polyolefin in the recovery zone.

7. The method of claim 4, which further comprises heating the polyolefin in the extrusion zone to facilitate the venting of steam and the removal of remaining unreacted monomer(s).

8. A method for the recovery of a high-molecular-weight amorphous polyolefin which comprises:

reacting monomer(s) in a reactor to form a high molecular weight amorphous polyolefin;

continuously transferring blips of material containing the polyolefin along with residual catalyst and unreacted monomer(s) as a mixture from the reactor directly through a conduit which contains a blipper valve to a kneader, the kneader having rotatable sigma blades, a kneader vent line and a kneader vent valve for venting unreacted monomer(s);

venting unreacted monomer(s) from the kneader through the vent line and vent valve;

controlling the operation of the blipper valve and the kneader vent valve to transfer material blips from the reactor to the kneader primarily when the blipper valve is open and when the kneader vent valve is closed to substantially avoid carryover of polyolefin into the kneader vent line during the venting step;

heating the mixture of material blips in the kneader to a temperature of from about 250° F. to 500° F. while kneading the mixture for a time sufficient to remove unreacted monomer(s) from the polyolefin and to facilitate transfer of the recovered polyolefin from the kneader to an extruder; and controlling the material blip transfer, heating and kneading steps to maintain a substantially constant inventory of the polyolefin in the kneader.

9. The method of claim 8, which further comprises deactivating residual catalyst contained in the polyolefin in the extruder.

10. The method of claim 9, which further comprises deactivating the catalyst by mixing the polyolefin with steam in the extruder.

11. The method of claim 8, wherein the kneading step comprises mechanically working the polyolefin in the kneader by rotating the sigma blades for a time sufficient to facilitate the removal of unreacted monomer(s).

12. The method of claim 8, which further comprises controlling the temperature of the polyolefin in the extruder to be substantially the same as the temperature of the polyolefin in the kneader.

13. The method of claim 9, which further comprises heating the polyolefin in the extruder to facilitate the venting of steam and the removal of remaining unreacted monomer(s).

14. The method of claim 8, wherein the material blips are transferred to the recovery zone without introducing water therein.

15. A method for the recovery of a high-molecular-weight sticky amorphous polyolefin which consists essentially of:

reacting monomer(s) in a reactor to form a high molecular weight amorphous polyolefin;

continuously transferring blips of material containing the polyolefin along with residual catalyst and unreacted monomer(s) as a mixture from the reactor directly through a conduit which contains a blipper valve to a kneader, the kneader having rotatable sigma blades, a kneader vent line and a kneader vent valve for venting unreacted monomer(s);

venting unreacted monomer(s) from the kneader through the vent line and vent valve;

controlling the operation of the blipper valve and the kneader vent valve to transfer material blips from the reactor to the kneader without introducing water and primarily when the blipper valve is open and when the kneader vent valve is closed to substantially avoid carryover of polyolefin into the kneader vent line during the venting step;

heating the mixture of material blips in the kneader to a temperature of from about 250° F. to 500° F. while kneading the mixture for a time sufficient to remove unreacted monomer(s) from the polyolefin and to facilitate transfer of the recovered polyolefin from the kneader to an extruder;

controlling the material blip transfer, heating and kneading steps to maintain a substantially constant inventory of the polyolefin in the kneader;

recovering the polyolefin from the kneader;

transferring the recovered polyolefin from the kneader to an extruder; and deactivating residual catalyst contained in the polyolefin by mixing the polyolefin in the extruder with steam in an amount sufficient only to deactivate the catalyst, but insufficient to transport the polyolefin.

16. The method of claim 1 which further comprises recovering the polyolefin from the recovery zone.

17. The method of claim 8 which further comprises recovering the polyolefin from the kneader.

18. The method of claim 17 which further comprises transferring the recovered polyolefin from the kneader to an extruder.

* * * * *